US012696277B2

(12) United States Patent
Sun

(10) Patent No.: US 12,696,277 B2
(45) Date of Patent: Jul. 28, 2026

(54) INFORMATION TRANSMISSION METHOD, TERMINAL, AND NETWORK SIDE DEVICE

(71) Applicant: VIVO MOBILE COMMUNICATION CO., LTD., Dongguan (CN)

(72) Inventor: Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 500 days.

(21) Appl. No.: 18/120,063

(22) Filed: Mar. 10, 2023

(65) Prior Publication Data

US 2023/0217448 A1 Jul. 6, 2023

Related U.S. Application Data

(63) Continuation of application No. PCT/CN2021/120832, filed on Sep. 27, 2021.

(30) Foreign Application Priority Data

Sep. 29, 2020 (CN) .......................... 202011051182.7

(51) Int. Cl.
*H04W 72/21* (2023.01)
*H04W 36/08* (2009.01)
*H04W 72/0446* (2023.01)
*H04W 72/0453* (2023.01)

(52) U.S. Cl.
CPC ....... *H04W 72/21* (2023.01); *H04W 72/0446* (2013.01); *H04W 72/0453* (2013.01); *H04W 36/085* (2023.05)

(58) Field of Classification Search
CPC ............. H04W 72/21; H04W 72/0446; H04W 72/0453; H04W 36/085; H04W 36/0055; H04W 36/249; H04W 52/0229; H04L 5/0057; Y02D 30/70
See application file for complete search history.

(56) References Cited

U.S. PATENT DOCUMENTS

| | | | | |
|---|---|---|---|---|
| 12,069,652 | B2 * | 8/2024 | Wang | ...................... H04L 5/005 |
| 12,206,608 | B2 * | 1/2025 | Yamada | ............. H04W 56/001 |
| 12,262,313 | B2 * | 3/2025 | Wang | ................... H04W 76/40 |
| 2019/0349980 | A1 | 11/2019 | Li et al. | |
| 2021/0219327 | A1 * | 7/2021 | Jiang | ................... H04L 5/0094 |
| 2021/0329546 | A1 * | 10/2021 | Wang | ................... H04L 5/0053 |

(Continued)

FOREIGN PATENT DOCUMENTS

| | | |
|---|---|---|
| CN | 101483828 A | 7/2009 |
| CN | 111436138 A | 7/2020 |

(Continued)

OTHER PUBLICATIONS

Vivo, "PUSCH enhancements for URLLC", 3GPP TSG RAN WG1 #100bis e-Meeting, Apr. 20-30, 2020, R1-2001671.

(Continued)

*Primary Examiner* — Brian T O Connor
(74) *Attorney, Agent, or Firm* — The Webb Law Firm

(57) ABSTRACT

An information transmission method includes transmitting, by the terminal, a first uplink channel or signal, where the first uplink channel or signal has an association relation with a target channel or signal; and performing, by the terminal, an action for the target channel or signal according to the association relation.

20 Claims, 4 Drawing Sheets

(56) References Cited

U.S. PATENT DOCUMENTS

| | | | | |
|---|---|---|---|---|
| 2022/0150744 A1* | 5/2022 | Wang | .................... | H04L 5/0048 |
| 2024/0080874 A1* | 3/2024 | Khoshnevisan | ...... | H04L 5/0092 |
| 2024/0098723 A1* | 3/2024 | Kim | .................... | H04W 72/569 |
| 2024/0365324 A1* | 10/2024 | Zhang | .................. | H04L 5/0078 |

FOREIGN PATENT DOCUMENTS

| | | | |
|---|---|---|---|
| EP | 3694114 A1 | 8/2020 |
| WO | 2020135341 A1 | 7/2020 |

OTHER PUBLICATIONS

3rd Generation Partnership Project, "Technical Specification Group Radio Access Network; NR; Medium Access Control (MAC) protocol specification (Release 16)", 3GPP Draft, 38321-G10, Jul. 24, 2020.

* cited by examiner

Network-side device

11

11

Terminal

Terminal

200

| A terminal transmits a first uplink channel or signal, where the first uplink channel or signal has an association relation with a target channel or signal | ~ S202 |

| The terminal performs an action for a target channel or signal according to an association | ~ S204 |

<u>300</u>

600

Communication device

601    Processor ⇔ Memory    602

700

701    Radio frequency unit

Network module    702

710

Memory

709    Application

Operating system

Audio output unit    703

704

Input unit

Graphics processing unit    7041

708    Interface unit

Processor

Microphone    7042

707

User input unit

7071    Touch panel

7072    Another input device

706

Display unit    7061

Display panel

Sensor    705

INFORMATION TRANSMISSION METHOD, TERMINAL, AND NETWORK SIDE DEVICE

CROSS-REFERENCE TO RELATED APPLICATIONS

This application is a Bypass Continuation Application of PCT/CN2021/120832 filed Sep. 27, 2021, and claims priority to Chinese Patent Application No. 202011051182.7 filed Sep. 29, 2020, the disclosures of which are hereby incorporated by reference in their entireties.

BACKGROUND OF THE INVENTION

Field of the Invention

This application belongs to the field of communications technologies, and in particular, to an information transmission method, a terminal, and a network-side device.

Description of Related Art

When performing carrier/cell activation or carrier/cell switching, such as initially activating a cell or performing cell switching, a terminal needs to continuously measure the signal quality of channels in each beam direction. Due to the relatively large quantity of beam directions, it will lead to an excessively long carrier/cell activation time or carrier/cell switching time, resulting in additional transmission latency.

SUMMARY OF THE INVENTION

According to a first aspect, an information transmission method is provided, including: transmitting, by a terminal, a first uplink channel or signal, where the first uplink channel or signal has an association relation with a target channel or signal; and performing, by the terminal, an action for the target channel or signal according to the association relation.

According to a second aspect, an information transmission method is provided, including: receiving, by a network-side device, a first uplink channel or signal, where the first uplink channel or signal has an association relation with a target channel or signal; and transmitting or receiving, by the network-side device, the target channel or signal according to the association relation.

According to a third aspect, a terminal is provided, including: a communication module, configured to transmit a first uplink channel or signal, where the first uplink channel or signal has an association relation with a target channel or signal; and the communication module, further configured to perform an action for the target channel or signal according to the association relation.

According to a fourth aspect, a network-side device is provided, including: a communication module, configured to receive a first uplink channel or signal, where the first uplink channel or signal has an association relation with a target channel or signal; and the communication module, further configured to transmit or receive the target channel or signal according to the association relation.

According to a fifth aspect, a terminal is provided, including a processor, a memory, and a program or an instruction stored in the memory and executable on the processor, where when the program or instruction is executed by the processor, the method according to the first aspect is implemented.

According to a sixth aspect, a network-side device is provided, including a processor, a memory, and a program or an instruction stored in the memory and executable on the processor, where when the program or instruction is executed by the processor, the method according to the first aspect is implemented.

According to a seventh aspect, a non-transitory readable storage medium is provided, storing a program or an instruction, where when the program or instruction is executed by a processor, the method according to the first aspect, or the method according to the second aspect is implemented.

According to an eighth aspect, a computer program product is provided, including a processor, a memory, and a program or an instruction stored in the memory and executable on the processor, where when the program or instruction is executed by the processor, the method according to the first aspect, or the method according to the second aspect is implemented.

According to a ninth aspect, a chip is provided, including a processor and a communication interface, where the communication interface is coupled to the processor, and the processor is configured to run a program or an instruction to implement the method according to the first aspect, or implement the method according to the second aspect.

DESCRIPTION OF THE INVENTION

The technical solutions in the embodiments of this application are clearly described below with reference to the accompanying drawings in the embodiments of this application. Apparently, the described embodiments are merely some rather than all of the embodiments of this application. All other embodiments obtained by a person of ordinary skill in the art based on the embodiments of this application shall fall within the protection scope of this application.

In the specification and claims of this application, terms "first" and "second" are used to distinguish similar objects, but are not used to describe a specific sequence or order. It may be understood that the data used in such a way is interchangeable in proper circumstances, so that the embodiments of this application can be implemented in other sequences than the sequence illustrated or described herein. In addition, objects distinguished by "first" and "second" are usually of a type, and the number of objects is not limited. For example, a first object may be one or more than one. In addition, in the specification and claims, "and/or" means at least one of the connected objects, and the character "/" generally indicates an "or" relationship between associated objects.

It should be noted that, the technology described in this embodiment of this application is not limited to a long term evolution (LTE)/LTE-advanced (LTE-A) system, but may further be used in other wireless communication systems, such as code division multiple access (CDMA), time division multiple access (TDMA), frequency division multiple access (FDMA), orthogonal frequency division multiple access, (OFDMA), single-carrier frequency-division multiple access (SC-FDMA), and other systems. The terms "system" and "network" in this embodiment of this application are often used interchangeably, and the described technologies may be used both for the systems and radio technologies mentioned above and may also be used for other systems and radio technologies. The following descriptions describe a new radio (NR) system for the objective of being used as an example, and NR terms are used in most of the descriptions below. However, these technologies may also be applied to applications other than NR system applications, such as a $6^{th}$ generation (6G) communication system.

Figures 1, 2:
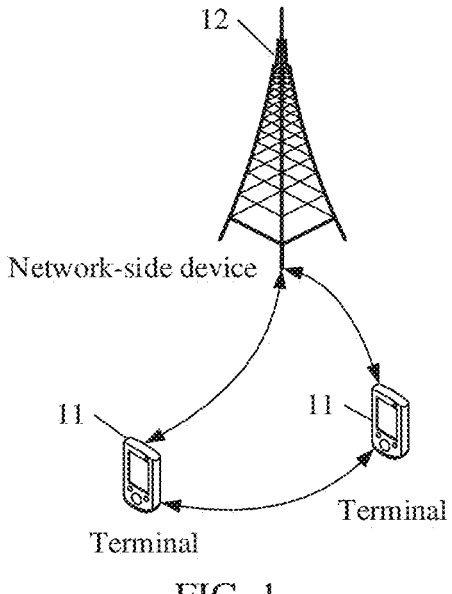
FIG. 1 is a block diagram of a wireless communication system according to an embodiment of this application.
FIG. 2 is a schematic flowchart of an information transmission method according to an embodiment of this application.

FIG. 1 is a block diagram of a wireless communication system to which an embodiment of this application may be applied. The wireless communication system includes a terminal 11 and a network-side device 12. The terminal 11 may also be referred to as a terminal device or user equipment (UE). The terminal 11 may be a terminal-side device such as a mobile phone, a tablet personal computer, a laptop computer, or referred to as a notebook computer, a personal digital assistant (PDA), a palmtop computer, a netbook, an ultra-mobile personal computer (UMPC), a mobile Internet device (MID), a wearable device, or vehicle user equipment (VUE), and pedestrian user equipment, (PUE). The wearable device includes: a bracelet, headphones, glasses, or the like. It is to be noted that, in this embodiment of this application, a specific type of the terminal 11 is not limited. The network-side device 12 may be a base station or a core network, where the base station may be referred to as a node B, an evolved node B, an access point, a base transceiver station (BTS), a radio base station, a radio transceiver, a basic service set (BSS), an extended service set (ESS), a node B, an evolved node B (eNB), a household node B, a household evolved node B, a WLAN access point, a WiFi node, a transmission and reception point (TRP) or some other proper terms in the field. Provided that the same technical effect is achieved, the base station is not limited to a specific technical vocabulary. It is to be noted that, in this embodiment of this application, only a base station in the NR system is used as an example, but a specific type of the base station is not limited.

The information transmission method, the terminal, and the network-side device provided in this embodiment of this application are described in detail below by using specific embodiments and application scenarios with reference to the accompanying drawings.

As shown in FIG. 2, an embodiment of this application provides an information transmission method 200. The method may be performed by a terminal. In other words, the method may be performed by software or hardware installed in the terminal, and the method includes the following steps.

S202. A terminal transmits a first uplink channel or signal, where the first uplink channel or signal has an association relation with a target channel or signal.

S204. The terminal performs an action for the target channel or signal according to the association relation.

The target channel or signal may be a second uplink channel or signal, and may further be a downlink channel or signal. In a case that the target channel or signal is a second uplink channel or signal, the performing an action for the target channel or signal mentioned in S204 may be, for example, transmitting the second uplink channel or signal; and in a case that the target channel or signal is a downlink channel or signal, the performing an action for the target channel or signal mentioned in S204 may be, for example, receiving, measuring, or monitoring the downlink channel or signal.

Optionally, the first uplink channel or signal mentioned in S202 may be used by a network-side device to perform beam scanning on its own beam, and then, determine a beam with the best signal quality (for the terminal); and the beam with the best signal quality may correspond to the target channel or signal (for example, SSB). Therefore, the target channel or signal may be used by the terminal to determine the beam with the best signal quality, and may further measure the SSB, and then, receive downlink data from the network-side device through the beam.

The first uplink signal mentioned in each embodiment of the specification may include at least one of the following: a sounding reference signal (SRS), or a random access preamble; and the first uplink channel mentioned in each embodiment of the specification may include at least one of the following: a physical uplink shared channel (PUSCH), a physical uplink control channel (PDCCH), or the like.

The target signal mentioned in each embodiment of the specification includes at least one of the following: a synchronization signal and PBCH block (SSB), a tracking reference signal (TRS), a channel state information-reference signal (CSI-RS), an SRS, or a preamble; and the target channel mentioned in each embodiment of the specification includes at least one of the following: a physical downlink control channel (PDCCH), a physical downlink shared channel (PDSCH), a PUSCH, a PUCCH, or the like.

The CSI-RS mentioned above may include a CSI-RS used for beam management (BM), a CSI-RS used for channel state information, a CSI-RS used for mobility management, or the like.

The SRS may be one or more of a specific SRS set used for beam management.

The preamble may be a specific preamble in a plurality of transmissions performed by the terminal.

The PUSCH may be a specific port or a specific repetition of a demodulation reference signal (DMRS) of the PUSCH.

The PUCCH may be a specific port or a specific repetition of a DMRS of the PUCCH.

Optionally, the first uplink channel or signal and the target channel or signal may belong to the same cell, or may belong to different cells; and may correspond to the same physical cell identifier (PCI), or may correspond to different PCIs.

Optionally, the association relation mentioned in each embodiment of the specification may further be used for indicating at least one of the following:

1) A correspondence between spatial features of the target channel or signal and spatial features of the first uplink channel or signal. In this way, the terminal may determine the spatial feature of the target channel or signal according to the spatial feature of the first uplink channel or signal, and then transmit, receive, monitor, or measure the target channel or signal. In the example, the spatial feature is indicated by an association relation between channels or signals, and the spatial feature does not need to be separately configured for the network device, which is convenient for saving configuration resources.

2) A timing relation between the target channel or signal and the first uplink channel or signal. In this way, the terminal may determine a time domain location of the target channel or signal according to a time domain location of the first uplink channel or signal and the timing relation (for example, a timing interval), and then, transmit, receive, monitor, or measure the target channel or signal. In the example, the time domain location is indicated by an association relation between channels or signals, and the time domain location does not need to be separately configured for the network device, which is convenient for saving configuration resources.

3) A frequency relation between the target channel or signal and the first uplink channel or signal. In this way, the terminal may determine a frequency domain location of the target channel or signal according to a frequency domain location of the first uplink channel or signal and the frequency relation (for example, a frequency interval), and then transmit, receive, monitor, or measure the target channel or signal. In the example, the frequency domain location is indicated by an association relation between channels or signals, and the frequency domain location does not need to be separately configured for the network device, which is convenient for saving configuration resources.

4) Frequency deviation information of the target channel or signal relative to the first uplink channel or signal. For example, the frequency deviation information of the target channel or signal is the same as the frequency deviation information of the first uplink channel or signal. In this way, the terminal may determine the frequency deviation information of the target channel or signal, and then transmit, receive, monitor, or measure the target channel or signal. In the example, the frequency deviation relation is indicated by an association relation between channels or signals, and the frequency deviation relation does not need to be separately configured for the network device, which is convenient for saving configuration resources.

5) Reception time point information of the target channel or signal associated with the first uplink channel or signal. For example, a reception/transmission moment of the target channel or signal is a transmission moment of the first uplink channel or signal plus a preset time interval. In this way, the terminal may determine the reception time point information of the target channel or signal, and then receive, monitor, or measure the target channel or signal. In the example, the frequency domain location is indicated by an association relation between channels or signals, and the frequency domain location does not need to be separately configured for the network device, which is convenient for saving configuration resources.

6) A physical cell identifier (PCI) corresponding to the target channel or signal associated with the first uplink channel or signal. For example, the PCI corresponding to the target channel or signal is the same as a PCI corresponding to the first uplink channel or signal. In this way, the terminal may determine the PCI of the target channel or signal, and then transmit, receive, monitor, or measure the target channel or signal. In the example, the PCI is indicated by an association relation between channels or signals, and the PCI does not need to be separately configured for the network device, which is convenient for saving configuration resources.

In an example, after the terminal transmits the first uplink channel or signal in S202, and before S202, the network-side device may transmit configuration/activation/indication information, thereby indicating to the terminal the association relation between the first uplink channel or signal and the target channel or signal, or indicating a target channel or signal associated with the first uplink channel or signal transmitted by the terminal. In this way, the terminal may obtain the association relation between the target channel or signal and the first uplink channel or signal through S202.

In another example, before S202, that is, before the terminal transmits the first uplink channel or signal, the network-side device may transmit configuration information. The configuration information is used for configuring an association relation between one or more first uplink channels or signals and one or more target channels or signals, where when there are a plurality of first uplink channels or signals, the plurality of first uplink channels or signals may be distinguished by a channel or signal type, a resource identifier, a resource set identifier, or the like, and when there are a plurality of target channels or signals, the plurality of target channels or signals may also be distinguished by a channel or signal type, a resource identifier, a resource set identifier, or the like. Through the configuration of the configuration information, after the terminal transmits the first uplink channel or signal in S202, the network-side device may transmit activation/indication information, thereby indicating the association relation between the first uplink channel or signal transmitted by the terminal and the target channel or signal, or indicating a target channel or signal associated with the first uplink channel or signal transmitted by the terminal.

When the information transmission method provided in this embodiment of this application is applied in a carrier/cell activation or carrier/cell switching scenario, the terminal may transmit the first uplink channel or signal (for example, an SRS). Through the implementation of the foregoing two examples, the terminal does not need to perform operations such as beam measurement. The network-side device may measure a plurality of beams of the network-side device based on the first uplink channel or signal transmitted by the terminal, and indicate to the terminal the target channel or signal associated with the first uplink channel or signal through configuration/activation/indication information, or indicate the association relation between the first uplink channel or signal and the target channel or signal.

In the foregoing embodiment, it is equivalent to handing over a beam measurement task that originally needs to be performed by the terminal to the network-side device. Because the beam measurement capability of the network-side device is much greater than the beam measurement capability of a terminal side, the transmission latency is reduced and the power consumption of the terminal side is greatly reduced.

It is to be noted that, the "cell" mentioned in each embodiment of the specification, in addition to the meaning of a physical cell, may further include a master and secondary carrier cell of the terminal during carrier aggregation. For example, cell activation/switching may refer to secondary carrier activation or physical cell switching.

In the information transmission method provided in this embodiment of this application, the terminal transmits a first uplink channel or signal, where the first uplink channel or signal has an association relation with a target channel or signal. For example, the terminal may transmit, measure, or receive the target channel or signal based on the association relation. When this embodiment of this application is applied in a carrier/cell activation or carrier/cell switching scenario, the terminal does not need to perform operations such as beam measurement, which reduces the transmission latency of the terminal and greatly reduces the power consumption of the terminal.

Optionally, the target channel or signal mentioned in the embodiment 200 includes a second uplink channel or signal, and the association relation includes a first association relation between the first uplink channel or signal and the target channel or signal. The performing, by the terminal, an action for the target channel or signal according to the association relation mentioned in the embodiment 200 includes: transmitting, by the terminal, the second uplink channel or signal according to the first association relation. In this embodiment, the terminal may transmit the second uplink channel or signal according to the first association relation. The network-side device does not need to separately configure time-frequency resources of the second uplink channel or signal. The terminal also does not need to receive the time-frequency resource configuration, and directly transmits the second uplink channel or signal according to the association relation, which is also convenient to reduce a latency of the terminal.

Optionally, the target channel or signal mentioned in the embodiment 200 includes a downlink channel or signal, and the association relation includes: a second association relation between the first uplink channel or signal and the downlink channel or signal. The performing, by the terminal, an action for the target channel or signal according to the association relation mentioned in the embodiment 200 includes: receiving or measuring, by the terminal, the downlink channel or signal according to the second association relation.

Optionally, each of the foregoing embodiments may further include the following step: obtaining, by the terminal, the association relation between the first uplink channel or signal and the target channel or signal.

In an example, the obtaining, by the terminal, the association relation between the first uplink channel or signal and the target channel or signal includes: obtaining, by the terminal, configuration information, such as receiving, by the terminal, the configuration information, or determining, by the terminal, configuration information indicated by activation/indication signaling, or the like. The configuration information is used for indicating the association relation; or the configuration information is used for indicating the association relation and indicating information required for transmitting the first uplink channel or signal.

In an example, the configuration information is located in configuration information of the target channel or signal, and/or is located in configuration information of the first uplink channel or signal.

Optionally, the configuration information includes at least one of the following:

1) a transmission configuration indicator (TCI) state. In the example, the target channel or signal is associated with the first uplink channel or signal through the TCI state; and for example, the first uplink channel or signal is configured in the TCI state of the target channel or signal.

2) A target information element (IE). In the example, the target channel or signal is associated with the first uplink channel or signal through the target information element. For example, the first uplink channel or signal is associated with the target channel or signal through a newly established information element, and the newly established information element is used for indicating the association relation between the first uplink channel or signal and the target channel or signal.

Optionally, the configuration information mentioned in each of the foregoing examples includes at least one of the following: a spatial relation between the target channel or signal and the first uplink channel or signal; a timing relation between the target channel or signal and the first uplink channel or signal; a frequency deviation relation between the target channel or signal and the first uplink channel or signal; spatial information of the target channel or signal and/or spatial information of the first uplink channel or signal; a time domain type of the target channel or signal and/or a time domain type of the first uplink channel or signal; frequency information of the target channel or signal and/or frequency information of the first uplink channel or signal; absolute frequency information of the target channel or signal and/or absolute frequency information of the first uplink channel or signal; or cell information of the target channel or signal and/or cell information of the first uplink channel or signal.

Optionally, the obtaining, by the terminal, the configuration information mentioned in each of the foregoing embodiments includes: obtaining, by the terminal, the configuration information according to at least one of the following: 1) radio resource control (RRC) configuration signaling; 2) media access control-control element (MAC CE) signaling; or 3) downlink control information (DCI) indication signaling.

In an example, before S202, the network-side device configures the association relation between one or more first uplink channels or signals and one or more target channels or signals for the terminal through the RRC configuration signaling. After the terminal transmits the first uplink channel or signal in S202, the network-side device indicates the association relation between the first uplink channel or signal transmitted by the terminal and the target channel or signal, or indicates a target channel or signal associated with the first uplink channel or signal transmitted by the terminal through the MAC CE signaling or the DCI indication signaling.

Optionally, the DCI is identified by at least one of the following: a specified DCI format, a specified radio network temporary identity (RNTI), a specified scrambling code, or a combination of specified domains. In the example, the terminal may identify the DCI used for indicating the association relation through at least one of the above.

Optionally, each of the foregoing embodiments may further include the following step: obtaining, by the terminal, the association relation between the plurality of target channels or signals and the plurality of first uplink channels or signals. In this way, the terminal may further detect/transmit the target channel or signal according to a predefined timing relation.

Optionally, the target channel or signal is determined by a configured control resource set (CORESET) and/or a search space (SS).

Optionally, in each of the foregoing embodiments, the terminal transmits the first uplink channel or signal, and transmits, measures, monitors, or receives the target channel or signal in a target time range, or the association relation mentioned in each of the foregoing embodiments is valid in a target time range. For example, in a specific target time range, the network-side device configures the terminal to associate a specific target channel or signal with a specific first uplink channel or signal transmitted by the terminal.

In other examples, the association relation may further have no limit on a time range; or have no limit on a start moment; or have no limit on an end moment.

A start moment of the target time range is determined by at least one of the following (may be directly equal to the following moment, or may further be a moment listed below plus a preset time value, or the like): 1) a moment at which a specified command is received, where optionally, the specified command is used for configuring the association relation, or activating a specific already configured association relation; 2) a moment at which a cell or a TRP activation command is received, such as a moment at which a secondary cell activation command is received; 3) a moment at which a cell or a TRP switching command is received, such as a moment at which a secondary cell switching command is received; or 4) a transmission moment of a specified uplink channel or signal, where the specified uplink channel or signal includes, but is not limited to, the first uplink channel or signal having an association relation.

An end moment of the target time range is determined via at least one of the following (may be directly equal to the following determined moment, or may further be a moment determined below plus a preset time value, or the like): 1) indication of signaling; 2) a pre-specified time range; or 3) a moment at which target signaling is received.

In an example, the end moment of the target time range is determined via the indication of signaling in 1), the signaling indicates the end moment and a duration of the target time range, or the signaling indicates the start moment and a duration of the target time range, where the duration is an absolute time length determined according to a preset time granularity; or the duration is a time length determined according to a quantity of occurrences of a preset event.

The preset time granularity includes, for example, a symbol corresponding to a specific sub-carrier spacing (SCS), a slot, a sub-frame, a frame, or the like.

The quantity of occurrences of the preset event includes, for example, the quantity of occurrences of a specific downlink channel or signal, or the like.

Optionally, the target signaling mentioned in 3) includes: signaling for deactivating the association relation; or signaling for reconfiguring or activating transmission assistance information of the target channel or signal. The transmission assistance information includes, but is not limited to, spatial information, time-frequency information, or the like.

An information transmission method according to this embodiment of this application is described in detail above with reference to FIG. 2. An information transmission method according to another embodiment of this application will be described in detail below with reference to FIG. 3. It may be understood that interaction between the network-side device and the terminal described from the network-side device is the same as the description on the terminal side in the method shown in FIG. 2, and related descriptions are appropriately omitted to avoid repetition.

Figure 3:
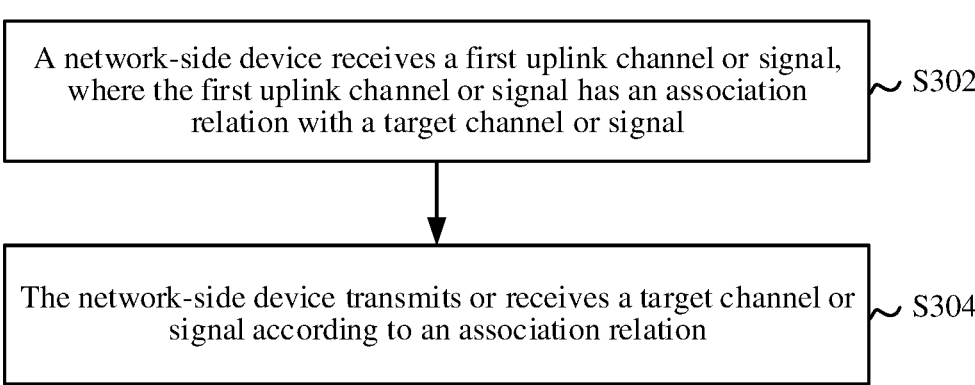
FIG. 3 is a schematic flowchart of an information transmission method according to another embodiment of this application.

FIG. 3 is a schematic flowchart of an implementation flowchart of an information transmission method according to an embodiment of this application, which may be applied to a network-side device. As shown in FIG. 3, the method 300 includes the following steps.

S302. A network-side device receives a first uplink channel or signal, where the first uplink channel or signal has an association relation with a target channel or signal.

S304. The network-side device transmits or receives the target channel or signal according to the association relation.

In this embodiment of this application, the network-side device receives a first uplink channel or signal, where the first uplink channel or signal has an association relation with a target channel or signal. Further, the terminal may transmit, measure, or receive the target channel or signal based on the association relation. In addition, the network-side device receives or transmits the target channel or signal according to the association relation. When this embodiment of this application is applied in a carrier/cell activation or carrier/cell switching scenario, the terminal does not need to perform operations such as beam measurement, which reduces the transmission latency of the terminal and greatly reduces the power consumption of the terminal.

Optionally, as an embodiment, the target channel or signal includes a second uplink channel or signal, the association relation includes: a first association relation between the first uplink channel or signal and the second uplink channel or signal, and the transmitting or receiving, by the network-side device, the target channel or signal according to the association relation includes: receiving, by the network-side device, the second uplink channel or signal according to the first association relation.

Optionally, as an embodiment, the target channel or signal includes a downlink channel or signal, the association relation includes: a second association relation between the first uplink channel or signal and the downlink channel or signal, and the transmitting or receiving, by the network-side device, the target channel or signal according to the association relation includes: transmitting, by the network-side device, the downlink channel or signal according to the second association relation.

Optionally, as an embodiment, the association relation is valid in a target time range.

Optionally, as an embodiment, a start moment of the target time range is determined by at least one of the following: a moment at which a specified command is transmitted; a moment at which a cell or a transmission and reception point TRP activation command is transmitted; a moment at which a cell or a TRP switching command is transmitted; or a reception moment of a specified uplink channel or signal.

Optionally, as an embodiment, an end moment of the target time range is determined via at least one of the following: indication of signaling; a pre-specified time range; or a moment at which target signaling is transmitted.

Optionally, as an embodiment, the end moment of the target time range is determined via the indication of signaling, the signaling indicates the end moment and a duration of the target time range, or the signaling indicates the start moment and a duration of the target time range, where the duration is an absolute time length determined according to a preset time granularity; or the duration is a time length determined according to a quantity of occurrences of a preset event.

Optionally, as an embodiment, the target signaling includes: signaling for deactivating the association relation; or signaling for reconfiguring or activating transmission assistance information of the target channel or signal.

Optionally, as an embodiment, the association relation is used for indicating at least one of the following: a correspondence between spatial features of the target channel or signal and spatial features of the first uplink channel or signal; a timing relation between the target channel or signal and the first uplink channel or signal; a frequency relation between the target channel or signal and the first uplink channel or signal; frequency deviation information of the target channel or signal relative to the first uplink channel or signal; reception time point information of the target channel or signal associated with the first uplink channel or signal;

or a physical cell identifier PCI corresponding to the target channel or signal associated with the first uplink channel or signal.

Optionally, as an embodiment, the method further includes: transmitting, by the network-side device, configuration information, where the configuration information is used for indicating the association relation; or the configuration information is used for indicating the association relation and information required for transmitting the first uplink channel or signal.

Optionally, as an embodiment, the configuration information is located in configuration information of the target channel or signal, and/or is located in configuration information of the first uplink channel or signal.

Optionally, as an embodiment, the configuration information includes at least one of the following: a transmission configuration indicator TCI state; or a target information element IE.

Optionally, as an embodiment, the configuration information includes at least one of the following: a spatial relation between the target channel or signal and the first uplink channel or signal; a timing relation between the target channel or signal and the first uplink channel or signal; a frequency deviation relation between the target channel or signal and the first uplink channel or signal; spatial information of the target channel or signal and/or spatial information of the first uplink channel or signal; a time domain type of the target channel or signal and/or a time domain type of the first uplink channel or signal; frequency information of the target channel or signal and/or frequency information of the first uplink channel or signal; absolute frequency information of the target channel or signal and/or absolute frequency information of the first uplink channel or signal; or cell information of the target channel or signal and/or cell information of the first uplink channel or signal.

Optionally, as an embodiment, the network-side device transmits the configuration information through downlink control information DCI, and the DCI is identified by at least one of the following: a specified DCI format, a specified radio network temporary identity RNTI, a specified scrambling code, or a combination of specified domains.

Optionally, as an embodiment, the plurality of target channels or signals are indicated through a configured control resource set CORESET and/or a search space SS.

Optionally, as an embodiment, the first uplink signal includes at least one of the following: a sounding reference signal SRS, or a random access preamble; and the first uplink channel comprises at least one of the following: a physical uplink shared channel PUSCH, or a physical uplink control channel PUCCH.

Optionally, as an embodiment, the target signal includes at least one of the following: a synchronization signal and PBCH block SSB, a tracking reference signal TRS, a channel state information-reference signal CSI-RS, an SRS, or a preamble; and the target channel includes at least one of the following: a physical downlink control channel PDCCH, a physical downlink shared channel PDSCH, a PUSCH, or a PUCCH. It is to be noted that, in the information transmission method provided in this embodiment of this application, an execution entity may be a terminal, or a control module configured to perform the information transmission method in the terminal. In this embodiment of this application, the terminal performing the information transmission method is used as an example to describe the terminal provided in this embodiment of this application.

Figure 4:
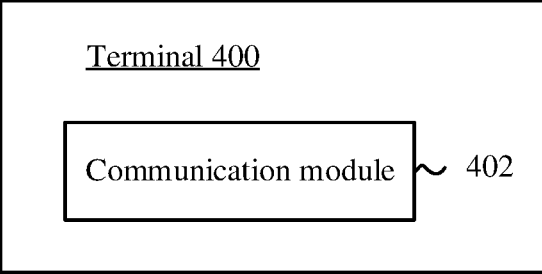
FIG. 4 is a schematic structural diagram of a terminal according to an embodiment of this application.

FIG. 4 is a schematic structural diagram of a terminal according to an embodiment of this application. As shown in FIG. 4, a terminal 400 includes the following modules.

a communication module 402, configured to transmit a first uplink channel or signal, where the first uplink channel or signal has an association relation with a target channel or signal.

The communication module 402 may further be configured to perform an action for the target channel or signal according to the association relation.

In this embodiment of this application, the terminal transmits a first uplink channel or signal, where the first uplink channel or signal has an association relation with a target channel or signal. For example, the terminal may transmit, measure, or receive the target channel or signal based on the association relation. When this embodiment of this application is applied in a carrier/cell activation or carrier/cell switching scenario, the terminal does not need to perform operations such as beam measurement, which reduces the transmission latency of the terminal and greatly reduces the power consumption of the terminal.

Optionally, as an embodiment, the target channel or signal includes a second uplink channel or signal, and the association relation includes: a first association relation between the first uplink channel or signal and the second uplink channel or signal. The communication module 402 may be configured to transmit the second uplink channel or signal according to the first association relation.

Optionally, as an embodiment, the target channel or signal includes a downlink channel or signal, and the association relation includes: a second association relation between the first uplink channel or signal and the downlink channel or signal. The communication module 402 may be configured to receive or measure the downlink channel or signal according to the second association relation.

Optionally, as an embodiment, the association relation is valid in a target time range.

Optionally, as an embodiment, a start moment of the target time range is determined by at least one of the following: a moment at which a specified command is received; a moment at which a cell or a transmission and reception point TRP activation command is received; a moment at which a cell or a TRP switching command is received; or a transmission moment of a specified uplink channel or signal.

Optionally, as an embodiment, an end moment of the target time range is determined via at least one of the following: indication of signaling; a pre-specified time range; or a moment at which target signaling is received.

Optionally, as an embodiment, the end moment of the target time range is determined via the indication of signaling, the signaling indicates the end moment and a duration of the target time range, or the signaling indicates the start moment and a duration of the target time range, where the duration is an absolute time length determined according to a preset time granularity; or the duration is a time length determined according to a quantity of occurrences of a preset event.

Optionally, as an embodiment, the target signaling includes: signaling for deactivating the association relation; or signaling for reconfiguring or activating transmission assistance information of the target channel or signal.

Optionally, as an embodiment, the association relation is used for indicating at least one of the following: a correspondence between spatial features of the target channel or signal and spatial features of the first uplink channel or signal; a timing relation between the target channel or signal and the first uplink channel or signal; a frequency relation between the target channel or signal and the first uplink channel or signal; frequency deviation information of the target channel or signal relative to the first uplink channel or signal; reception time point information of the target channel or signal associated with the first uplink channel or signal; or a physical cell identifier PCI corresponding to the target channel or signal associated with the first uplink channel or signal.

Optionally, as an embodiment, an obtaining module is further included, which may be configured to obtain an association relation between the first uplink channel or signal and the target channel or signal.

Optionally, as an embodiment, an obtaining module may be configured to obtain configuration information, where the configuration information is used for indicating the association relation; or the configuration information is used for indicating the association relation and information required for transmitting the first uplink channel or signal.

Optionally, as an embodiment, the configuration information is located in configuration information of the target channel or signal, and/or is located in configuration information of the first uplink channel or signal.

Optionally, as an embodiment, the configuration information includes at least one of the following: a transmission configuration indicator TCI state; or a target information element IE.

Optionally, as an embodiment, the configuration information includes at least one of the following: a spatial relation between the target channel or signal and the first uplink channel or signal; a timing relation between the target channel or signal and the first uplink channel or signal; a frequency deviation relation between the target channel or signal and the first uplink channel or signal; spatial information of the target channel or signal and/or spatial information of the first uplink channel or signal; a time domain type of the target channel or signal and/or a time domain type of the first uplink channel or signal; frequency information of the target channel or signal and/or frequency information of the first uplink channel or signal; absolute frequency information of the target channel or signal and/or absolute frequency information of the first uplink channel or signal; or cell information of the target channel or signal and/or cell information of the first uplink channel or signal.

Optionally, as an embodiment, the obtaining module obtains the configuration information, including: obtaining the configuration information according to at least one of the following: radio resource control RRC configuration signaling; medium access control control element MAC CE activation signaling; or downlink control information DCI indication signaling.

Optionally, as an embodiment, the DCI is identified by at least one of the following: a specified DCI format, a specified radio network temporary identity RNTI, a specified scrambling code, or a combination of specified domains.

Optionally, as an embodiment, the target channel or signal is determined by a configured control resource set CORESET and/or a search space SS.

Optionally, as an embodiment, the first uplink signal includes at least one of the following: a sounding reference signal SRS, or a random access preamble; and the first uplink channel includes at least one of the following: a physical uplink shared channel PUSCH, or a physical uplink control channel PUCCH.

Optionally, as an embodiment, the target signal includes at least one of the following: a synchronization signal and PBCH block SSB, a tracking reference signal TRS, a channel state information-reference signal CSI-RS, an SRS, or a preamble; and the target channel includes at least one of the following: a physical downlink control channel PDCCH, a physical downlink shared channel PDSCH, a PUSCH, or a PUCCH.

The terminal 400 in this embodiment of this application may refer to a process of the method 200 corresponding to this embodiment of this application. Various units/modules in the terminal 400 and other operations and/or functions are respectively for implementing corresponding processes in the method 200, and may implement the same or equivalent technical effects. For brevity, details are not described herein again.

The terminal in this embodiment of this application may be an apparatus, and may also be a component in a terminal, an integrated circuit, or a chip. The apparatus may be a mobile terminal, or may be a non-mobile terminal. For example, the mobile terminal may include, but is not limited to, a type of the terminal 11 listed above, and a non-mobile terminal may be a server, a network attached storage (NAS), a personal computer (PC), a television (TV), a cash machine, a self-service machine, or the like, which is not limited in this embodiment of this application.

The terminal in this embodiment of this application may be an apparatus having an operating system. The operating system may be an Android operating system, may be an ios operating system, and may further be another possible operating system, which is not limited in this embodiment of this application.

The terminal provided in this embodiment of this application may implement various processes of the method embodiment in FIG. 2 and the following, and implement the same technical effect, which will not be described in detail herein again to avoid repetition.

Figure 5:
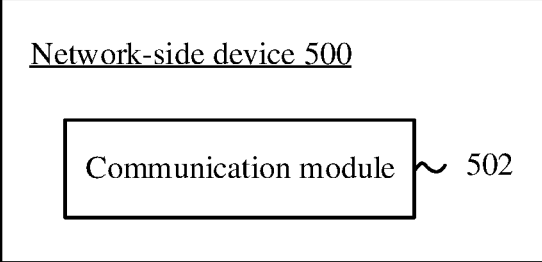
FIG. 5 is a schematic structural diagram of a network-side device according to another embodiment of this application.

FIG. 5 is a schematic structural diagram of a network-side device according to an embodiment of this application. As shown in FIG. 5, a network-side device 500 includes the following modules.

A communication module 502 may be configured to receive a first uplink channel or signal, where the first uplink channel or signal has an association relation with a target channel or signal.

The communication module 502 may be configured to transmit or receive the target channel or signal according to the association relation.

In this embodiment of this application, the network-side device receives a first uplink channel or signal, where the first uplink channel or signal has an association relation with a target channel or signal. For example, the terminal may transmit, measure, or receive the target channel or signal based on the association relation. In addition, the network-side device receives or transmits the target channel or signal according to the association relation. When this embodiment of this application is applied in a carrier/cell activation or carrier/cell switching scenario, the terminal does not need to perform operations such as beam measurement, which reduces the transmission latency of the terminal and greatly reduces the power consumption of the terminal.

Optionally, as an embodiment, the target channel or signal includes a second uplink channel or signal, and the association relation includes: a first association relation between the first uplink channel or signal and the second uplink channel or signal. The communication module 502 may be configured to receive the second uplink channel or signal according to the first association relation.

Optionally, as an embodiment, the target channel or signal includes a downlink channel or signal, and the association relation includes: a second association relation between the first uplink channel or signal and the downlink channel or signal. The communication module 502 may be configured to transmit the downlink channel or signal according to the second association relation.

Optionally, as an embodiment, the association relation is valid in a target time range.

Optionally, as an embodiment, a start moment of the target time range is determined by at least one of the following: a moment at which a specified command is transmitted; a moment at which a cell or a transmission and reception point TRP activation command is transmitted; a moment at which a cell or a TRP switching command is transmitted; or a reception moment of a specified uplink channel or signal.

Optionally, as an embodiment, an end moment of the target time range is determined via at least one of the following: indication of signaling; a pre-specified time range; or a moment at which target signaling is transmitted.

Optionally, as an embodiment, the end moment of the target time range is determined via the indication of signaling, the signaling indicates the end moment and a duration of the target time range, or the signaling indicates the start moment and a duration of the target time range, where the duration is an absolute time length determined according to a preset time granularity; or the duration is a time length determined according to a quantity of occurrences of a preset event.

Optionally, as an embodiment, the target signaling includes: signaling for deactivating the association relation; or signaling for reconfiguring or activating transmission assistance information of the target channel or signal.

Optionally, as an embodiment, the association relation is used for indicating at least one of the following: a correspondence between spatial features of the target channel or signal and spatial features of the first uplink channel or signal; a timing relation between the target channel or signal and the first uplink channel or signal; a frequency relation between the target channel or signal and the first uplink channel or signal; frequency deviation information of the target channel or signal relative to the first uplink channel or signal; reception time point information of the target channel or signal associated with the first uplink channel or signal; or a physical cell identifier PCI corresponding to the target channel or signal associated with the first uplink channel or signal.

Optionally, as an embodiment, the communication module 502 may be configured to transmit configuration information, where the configuration information is used for indicating the association relation; or the configuration information is used for indicating the association relation and indicating information required for transmitting the first uplink channel or signal.

Optionally, as an embodiment, the configuration information is located in configuration information of the target channel or signal, and/or is located in configuration information of the first uplink channel or signal.

Optionally, as an embodiment, the configuration information includes at least one of the following: a transmission configuration indicator TCI state; or a target information element IE.

Optionally, as an embodiment, the configuration information includes at least one of the following: a spatial relation between the target channel or signal and the first uplink channel or signal; a timing relation between the target channel or signal and the first uplink channel or signal; a frequency deviation relation between the target channel or signal and the first uplink channel or signal; spatial information of the target channel or signal and/or spatial information of the first uplink channel or signal; a time domain type of the target channel or signal and/or a time domain type of the first uplink channel or signal; frequency information of the target channel or signal and/or frequency information of the first uplink channel or signal; absolute frequency information of the target channel or signal and/or absolute frequency information of the first uplink channel or signal; or cell information of the target channel or signal and/or cell information of the first uplink channel or signal.

Optionally, as an embodiment, the communication module 502 transmits the configuration information through downlink control information DCI, and the DCI is identified by at least one of the following: a specified DCI format, a specified radio network temporary identity RNTI, a specified scrambling code, or a combination of specified domains.

Optionally, as an embodiment, the target channel or signal is indicated through a configured control resource set CORESET and/or a search space SS.

Optionally, as an embodiment, the first uplink signal includes at least one of the following: a sounding reference signal SRS, or a random access preamble; and the first uplink channel includes at least one of the following: a physical uplink shared channel PUSCH, or a physical uplink control channel PUCCH.

Optionally, as an embodiment, the target signal includes at least one of the following: a synchronization signal and PBCH block SSB, a tracking reference signal TRS, a channel state information-reference signal CSI-RS, an SRS, or a preamble; and the target channel includes at least one of the following: a physical downlink control channel PDCCH, a physical downlink shared channel PDSCH, a PUSCH, or a PUCCH.

The network-side device 500 in this embodiment of this application may refer to a process of the method 300 corresponding to this embodiment of this application. Various units/modules in the network-side device 500 and other operations and/or functions are respectively for implementing corresponding processes in the method 300 and may implement the same or equivalent technical effects. For brevity, details are not described herein again.

Figure 6:
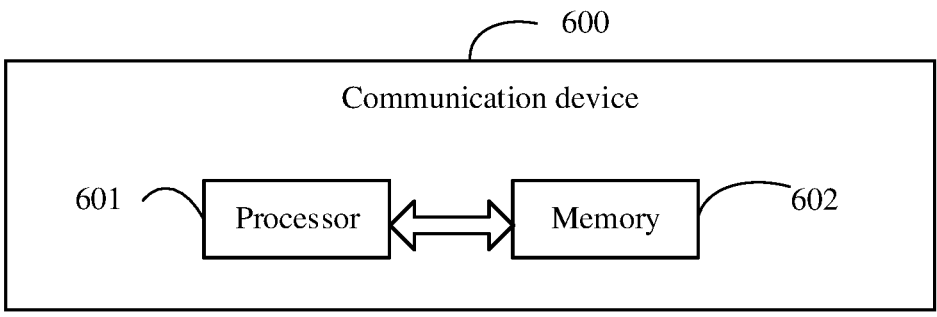
FIG. 6 is a schematic structural diagram of a communication device according to an embodiment of this application.

Optionally, as shown in FIG. 6, this embodiment of this application further provides a communication device 600, including a processor 601, a memory 602, and a program or an instruction stored in the memory 602 and executable on the processor 601. For example, when the communication device 600 is a terminal, the program or instruction, when executed by the processor 601, implements various processes of the information transmission method embodiment, and may implement the same technical effect. When the communication device 600 is a network-side device, the program or the instruction is executed by the processor 601 to implement the various processes of the information transmission method embodiment, and may implement the same technical effect, which will not be described in detail herein again to avoid repetition.

Figure 7:
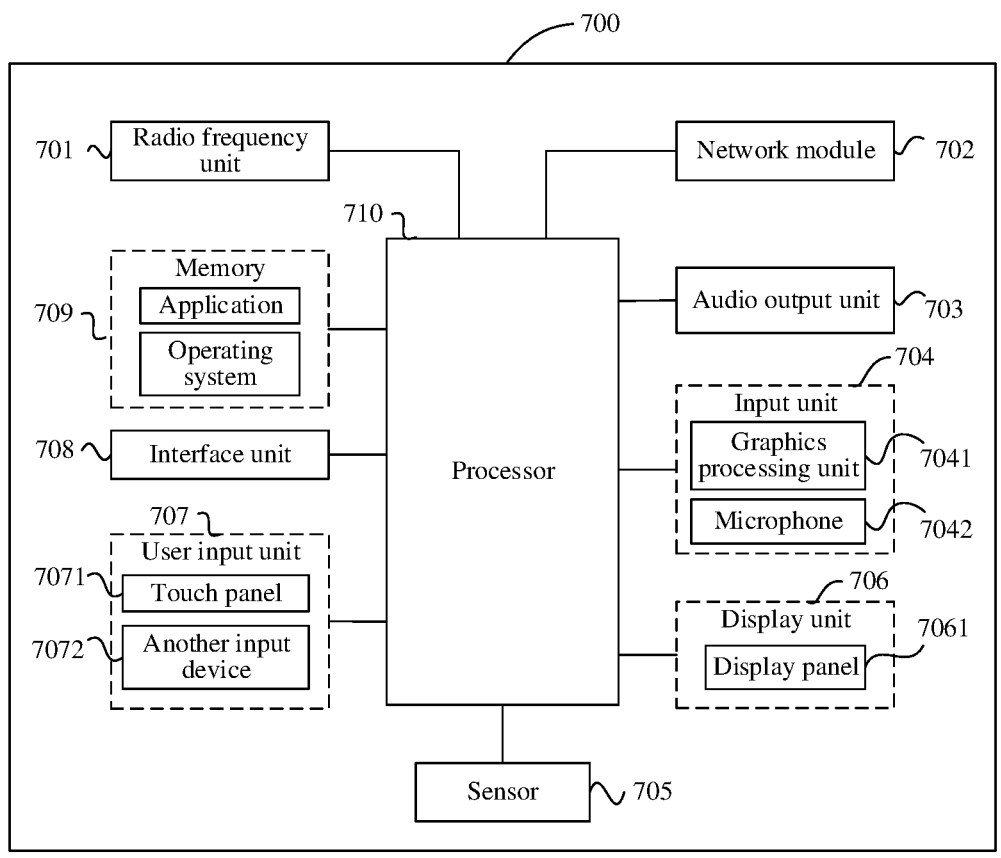
FIG. 7 is a schematic structural diagram of a terminal according to an according to an embodiment of this application.
Figure 8:
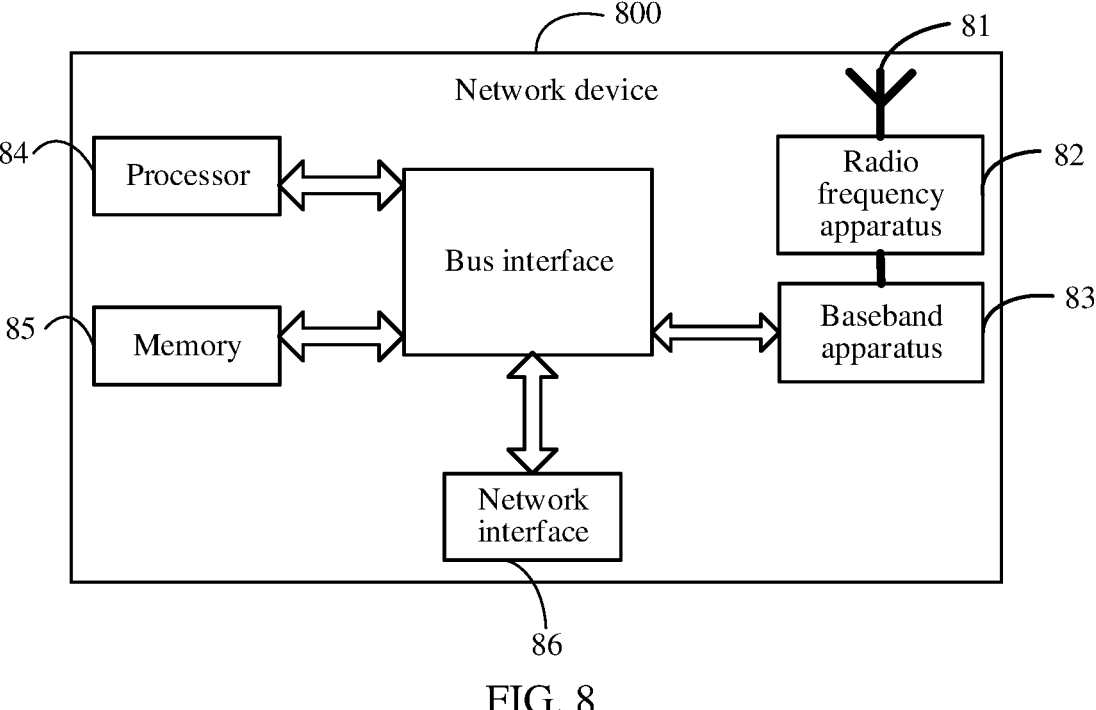
FIG. 8 is a schematic structural diagram of a network-side device according to an embodiment of this application.

FIG. 7 is a schematic diagram of a hardware structure of a terminal according to an embodiment of this application.

The terminal 700 includes, but is not limited to, components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include a power supply (such as a battery) for supplying power to the components. The power supply may be logically connected to the processor 710 by a power management system, thereby implementing functions such as charging, discharging, and power consumption management by using the power management system. A terminal structure shown in FIG. 7 does not constitute a limitation to the terminal, and the terminal may include more or fewer components than those shown in the figure, or some components may be combined, or a different component deployment may be used, and details are not repeated herein.

It should be understood that, in this embodiment of this application, the input unit 704 may include a graphics processing unit (GPU) 7041 and a microphone 7042. The graphics processing unit 7041 performs processing on image data of a static picture or a video that is obtained by an image acquisition apparatus (for example, a camera) in a video acquisition mode or an image acquisition mode. The display unit 706 may include a display panel 7061, and the display panel 7061 may be configured by using a liquid crystal display, an organic light-emitting diode, or the like. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include, but not limited to, a physical keyboard, a functional key (such as a volume control key or a switch key), a track ball, a mouse, and a joystick, which are not described herein in detail.

In this embodiment of this application, the radio frequency unit 701 receives downlink data from a network-side device and transmits the downlink data to the processor 710 for processing; and sends uplink data to the network-side device. Generally, the radio frequency unit 701 includes, but is not limited to, an antenna, at least one amplifier, a transceiver, a coupler, a low noise amplifier, a duplexer, and the like.

The memory 709 may be configured to store a software program or an instruction and various data. The memory 709 may mainly include a program or an instruction storage area and a data storage area. The program or instruction storage area may store an operating system, an application program or instruction required by at least one function (such as a sound playback function and an image display function), and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. Such as at least one magnetic disk storage device, a flash memory device, or other non-volatile solid-state storage devices.

The processor 710 may include one or more processing units; and optionally, the processor 710 may integrate an application processor and a modem processor. The application processor mainly processes an operating system, a user interface, an application program or instruction, and the like. The modem processor mainly processes wireless communication, such as a baseband processor. It may be understood that the foregoing modem may either not be integrated into the processor 710.

The radio frequency unit 701 is used for transmitting a first uplink channel or signal, where the first uplink channel or signal has an association relation with a target channel or signal; and the radio frequency unit 701 is further used for performing an action for the target channel or signal according to the association relation.

In this embodiment of this application, the terminal transmits a first uplink channel or signal, where the first uplink channel or signal has an association relation with a target channel or signal. For example, the terminal may transmit, measure, or receive the target channel or signal based on the association relation. When this embodiment of this application is applied in a carrier/cell activation or carrier/cell switching scenario, the terminal does not need to perform operations such as beam measurement, which reduces the transmission latency of the terminal and greatly reduces the power consumption of the terminal.

The terminal 700 provided in this embodiment of this application may further implement various processes of the information transmission method embodiment, and implement the same technical effect, which will not be described in detail herein again to avoid repetition.

An embodiment of this application further provides a network-side device. As shown in FIG. 7, the network device 700 includes: an antenna 71, a radio frequency apparatus 72, and a baseband apparatus 73. The antenna 71 is connected with the radio frequency apparatus 72. In an uplink direction, the radio frequency apparatus 72 receives information through the antenna 71, and transmits the received information to the baseband apparatus 73 for processing. In a downlink direction, the baseband apparatus 73 performs processing on the to-be-transmitted information, and transmits the to-be-transmitted information to the radio frequency apparatus 72. After performing processing on the received information, the radio frequency apparatus 72 transmits the received information out through the antenna 71.

The frequency band processing apparatus may be located in the baseband apparatus 73, and the method performed by the network-side device in the foregoing embodiments may be implemented in the baseband apparatus 73. The baseband apparatus 73 includes a processor 74 and a memory 75.

The baseband apparatus 73 may include, for example, at least one baseband board, and a plurality of chips are arranged on the baseband board. As shown in FIG. 7, for example, one of the chips is a processor 74, and is connected with the memory 75, to invoke a program in the memory 75, and to perform the network device operation shown in the foregoing method embodiments.

The baseband apparatus 73 may further include a network interface 76 used for exchanging information with the radio frequency apparatus 72. For example, the interface is a common public radio interface (CPRI).

The network-side device of this embodiment of the present invention further includes: an instruction or program stored on the memory 75 and executable on the processor 74. The processor 74 invokes the instruction or program in the memory 75 to perform the method performed by each module shown in FIG. 5, and implements the same technical effect, which will not be described in detail herein again to avoid repetition.

This embodiment of this application further provides a non-transitory readable storage medium storing therein a program or an instruction. The program or instruction, when executed by a processor, implements various processes of the embodiments of the information transmission method, and may implement the same technical effects, which will not be described in detail herein again to avoid repetition.

The processor may be a processor in the terminal described in the foregoing embodiment. The non-transitory readable storage medium includes a non-transitory computer-readable storage medium, for example, a Read-Only Memory (ROM), a Random Access Memory (RAM), a magnetic disk, an optical disc or the like.

This embodiment of this application further provides a chip. The chip includes a processor and a communication interface. The communication interface is coupled to the processor. The processor is configured to run a program or an instruction to implement various processes of the information transmission method embodiment, and may implement the same technical effects, which will not be described in detail herein again to avoid repetition.

It should be understood that, the chip mentioned in this embodiment of this application may further be referred to as a system-level chip, a system chip, a chip system, a system on chip, or the like.

This embodiment of this application further provides a computer program product, being stored in a non-volatile memory, where the computer program product, when executed by a processor, implements various processes of the information transmission method embodiment, and may implement the same technical effects. To avoid repetition, details are not described herein again.

This embodiment of this application further provides a communication device, which is configured to perform various processes of the information transmission method embodiment, and may implement the same technical effects. To avoid repetition, details are not described herein again.

It is to be noted that, the term "include", "comprise", or any other variation thereof in this specification intends to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present invention essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present invention.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An information transmission method, comprising:
   transmitting, by a terminal, a first uplink channel or signal, wherein the first uplink channel or signal has an association relation with a target channel or signal; and
   performing, by the terminal, an action for the target channel or signal according to the association relation;
   wherein the association relation is used for indicating at least one of:
   a timing relation between the target channel or signal and the first uplink channel or signal;
   a frequency relation between the target channel or signal and the first uplink channel or signal;
   frequency deviation information of the target channel or signal relative to the first uplink channel or signal;
   reception time point information of the target channel or signal associated with the first uplink channel or signal; or
   a physical cell identifier (PCI) corresponding to the target channel or signal associated with the first uplink channel or signal.

2. The method according to claim 1, wherein the target channel or signal comprises a second uplink channel or signal, the association relation comprises: a first association relation between the first uplink channel or signal and the second uplink channel or signal, and the performing, by the terminal, the action for the target channel or signal according to the association relation comprises:
   transmitting, by the terminal, the second uplink channel or signal according to the first association relation; or
   the target channel or signal comprises a downlink channel or signal, the association relation comprises: a second association relation between the first uplink channel or signal and the downlink channel or signal, and the performing, by the terminal, the action for the target channel or signal according to the association relation comprises:
   receiving or measuring, by the terminal, the downlink channel or signal according to the second association relation;
   wherein the association relation is valid in a target time range.

3. The method according to claim 2, wherein a start moment of the target time range is determined by at least one of:
   a moment at which a specified command is received;
   a moment at which a cell or a transmission and reception point (TRP) activation command is received;
   a moment at which a cell or a TRP switching command is received; or
   a transmission moment of a specified uplink channel or signal;
   or
   an end moment of the target time range is determined via at least one of:
   indication of signaling;
   a pre-specified time range; or
   a moment at which target signaling is received.

4. The method according to claim 3, wherein the end moment of the target time range is determined via the indication of signaling, the signaling indicates the end moment and a duration of the target time range, or the signaling indicates the start moment and a duration of the target time range, wherein the duration is an absolute time length determined according to a preset time granularity; or the duration is a time length determined according to a quantity of occurrences of a preset event;

or the target signaling comprises:

signaling for deactivating the association relation; or signaling for reconfiguring or activating transmission assistance information of the target channel or signal.

5. The method according to claim 1, wherein the association relation is further used for indicating:

a correspondence between spatial features of the target channel or signal and spatial features of the first uplink channel or signal.

6. The method according to claim 1, further comprising:

obtaining, by the terminal, the association relation between the first uplink channel or signal and the target channel or signal;

wherein the obtaining, by the terminal, the association relation between the first uplink channel or signal and the target channel or signal comprises:

obtaining, by the terminal, configuration information, wherein the configuration information is used for indicating the association relation; or the configuration information is used for indicating the association relation and information required for transmitting the first uplink channel or signal;

wherein the configuration information is located in configuration information of the target channel or signal, and/or is located in configuration information of the first uplink channel or signal.

7. The method according to claim 6, wherein the configuration information comprises at least one of:

a transmission configuration indicator (TCI) state; or a target information element (IE); or the configuration information comprises at least one of:

a spatial relation between the target channel or signal and the first uplink channel or signal;

a timing relation between the target channel or signal and the first uplink channel or signal;

a frequency deviation relation between the target channel or signal and the first uplink channel or signal;

spatial information of the target channel or signal and/or spatial information of the first uplink channel or signal;

a time domain type of the target channel or signal and/or a time domain type of the first uplink channel or signal;

frequency information of the target channel or signal and/or frequency information of the first uplink channel or signal;

absolute frequency information of the target channel or signal and/or absolute frequency information of the first uplink channel or signal; or cell information of the target channel or signal and/or cell information of the first uplink channel or signal.

8. The method according to claim 6, wherein the terminal obtains the configuration information through downlink control information (DCI), and the DCI is identified by at least one of:

a specified DCI format, a specified radio network temporary identity (RNTI), a specified scrambling code, or a combination of specified domains.

9. The method according to claim 1, wherein the target channel or signal is determined by a configured control resource set (CORESET) and/or a search space (SS);

the first uplink signal comprises at least one of: a sounding reference signal (SRS), or a random access preamble;

the first uplink channel comprises at least one of: a physical uplink shared channel (PUSCH), or a physical uplink control channel (PUCCH);

the target signal comprises at least one of: a synchronization signal and PBCH block (SSB), a tracking reference signal (TRS), a channel state information-reference signal (CSI-RS), an SRS, or a preamble; and the target channel comprises at least one of: a physical downlink control channel (PDCCH), a physical downlink shared channel (PDSCH), a PUSCH, or a PUCCH.

10. An information transmission method, comprising:

receiving, by a network-side device, a first uplink channel or signal, wherein the first uplink channel or signal has an association relation with a target channel or signal; and transmitting or receiving, by the network-side device, the target channel or signal according to the association relation;

wherein the association relation is used for indicating at least one of:

a timing relation between the target channel or signal and the first uplink channel or signal;

a frequency relation between the target channel or signal and the first uplink channel or signal;

frequency deviation information of the target channel or signal relative to the first uplink channel or signal;

reception time point information of the target channel or signal associated with the first uplink channel or signal; or a physical cell identifier (PCI) corresponding to the target channel or signal associated with the first uplink channel or signal.

11. The method according to claim 10, wherein the target channel or signal comprises a second uplink channel or signal, the association relation comprises: a first association relation between the first uplink channel or signal and the second uplink channel or signal, and the transmitting or receiving, by the network-side device, the target channel or signal according to the association relation comprises:

receiving, by the network-side device, the second uplink channel or signal according to the first association relation; or the target channel or signal comprises a downlink channel or signal, the association relation comprises: a second association relation between the first uplink channel or signal and the downlink channel or signal, and the transmitting or receiving, by the network-side device, the target channel or signal according to the association relation comprises:

transmitting, by the network-side device, the downlink channel or signal according to the second association relation;

wherein the association relation is valid in a target time range.

12. The method according to claim 11, wherein a start moment of the target time range is determined by at least one of:

a moment at which a specified command is transmitted;

a moment at which a cell or a transmission and reception point (TRP) activation command is transmitted;

a moment at which a cell or a TRP switching command is transmitted; or a reception moment of a specified uplink channel or signal; or an end moment of the target time range is determined via at least one of:

indication of signaling;

a pre-specified time range; or a moment at which target signaling is transmitted.

13. The method according to claim 12, wherein the end moment of the target time range is determined via the indication of signaling, the signaling indicates the end moment and a duration of the target time range, or the signaling indicates the start moment and a duration of the target time range, wherein the duration is an absolute time length determined according to a preset time granularity; or the duration is a time length determined according to a quantity of occurrences of a preset event; or the target signaling comprises:

signaling for deactivating the association relation; or signaling for reconfiguring or activating transmission assistance information of the target channel or signal.

14. The method according to claim 10, wherein the association relation is further used for indicating:

a correspondence between spatial features of the target channel or signal and spatial features of the first uplink channel or signal.

15. The method according to claim 10, further comprising:

transmitting, by the network-side device, configuration information, wherein the configuration information is used for indicating the association relation; or the configuration information is used for indicating the association relation and information required for transmitting the first uplink channel or signal;

wherein the configuration information is located in configuration information of the target channel or signal, and/or is located in configuration information of the first uplink channel or signal.

16. The method according to claim 15, wherein the configuration information comprises at least one of:

a transmission configuration indicator (TCI) state; or a target information element (IE); or the configuration information comprises at least one of:

a spatial relation between the target channel or signal and the first uplink channel or signal;

a timing relation between the target channel or signal and the first uplink channel or signal;

a frequency deviation relation between the target channel or signal and the first uplink channel or signal;

spatial information of the target channel or signal and/or spatial information of the first uplink channel or signal;

a time domain type of the target channel or signal and/or a time domain type of the first uplink channel or signal;

frequency information of the target channel or signal and/or frequency information of the first uplink channel or signal;

absolute frequency information of the target channel or signal and/or absolute frequency information of the first uplink channel or signal; or cell information of the target channel or signal and/or cell information of the first uplink channel or signal.

17. The method according to claim 15, wherein the network-side device transmits the configuration information through downlink control information (DCI), and the DCI is identified by at least one of:

a specified DCI format, a specified radio network temporary identity (RNTI), a specified scrambling code, or a combination of specified domains.

18. The method according to claim 10, wherein the target channel or signal is indicated through a configured control resource set (CORESET) and/or a search space (SS);

the first uplink signal comprises at least one of: a sounding reference signal (SRS), or a random access preamble;

the first uplink channel comprises at least one of: a physical uplink shared channel (PUSCH), or a physical uplink control channel (PUCCH);

the target signal comprises at least one of: a synchronization signal and PBCH block (SSB), a tracking reference signal (TRS), a channel state information-reference signal (CSI-RS), an SRS, or a preamble; and the target channel comprises at least one of: a physical downlink control channel (PDCCH), a physical downlink shared channel (PDSCH), a PUSCH, or a PUCCH.

19. A terminal, comprising a processor, a memory, and a program or an instruction stored in the memory and executable on the processor, wherein the program or instruction, when executed by the processor, causes the terminal to perform:

transmitting, a first uplink channel or signal, wherein the first uplink channel or signal has an association relation with a target channel or signal; and performing, an action for the target channel or signal according to the association relation;

wherein the association relation is used for indicating at least one of:

a timing relation between the target channel or signal and the first uplink channel or signal;

a frequency relation between the target channel or signal and the first uplink channel or signal;

frequency deviation information of the target channel or signal relative to the first uplink channel or signal;

reception time point information of the target channel or signal associated with the first uplink channel or signal; or a physical cell identifier (PCI) corresponding to the target channel or signal associated with the first uplink channel or signal.

20. A network-side device, comprising a processor, a memory, and a program or an instruction stored in the memory and executable on the processor, wherein when the program or instruction is executed by the processor, the information transmission method according to claim 10 is implemented.

\* \* \* \* \*